UNITED STATES PATENT OFFICE.

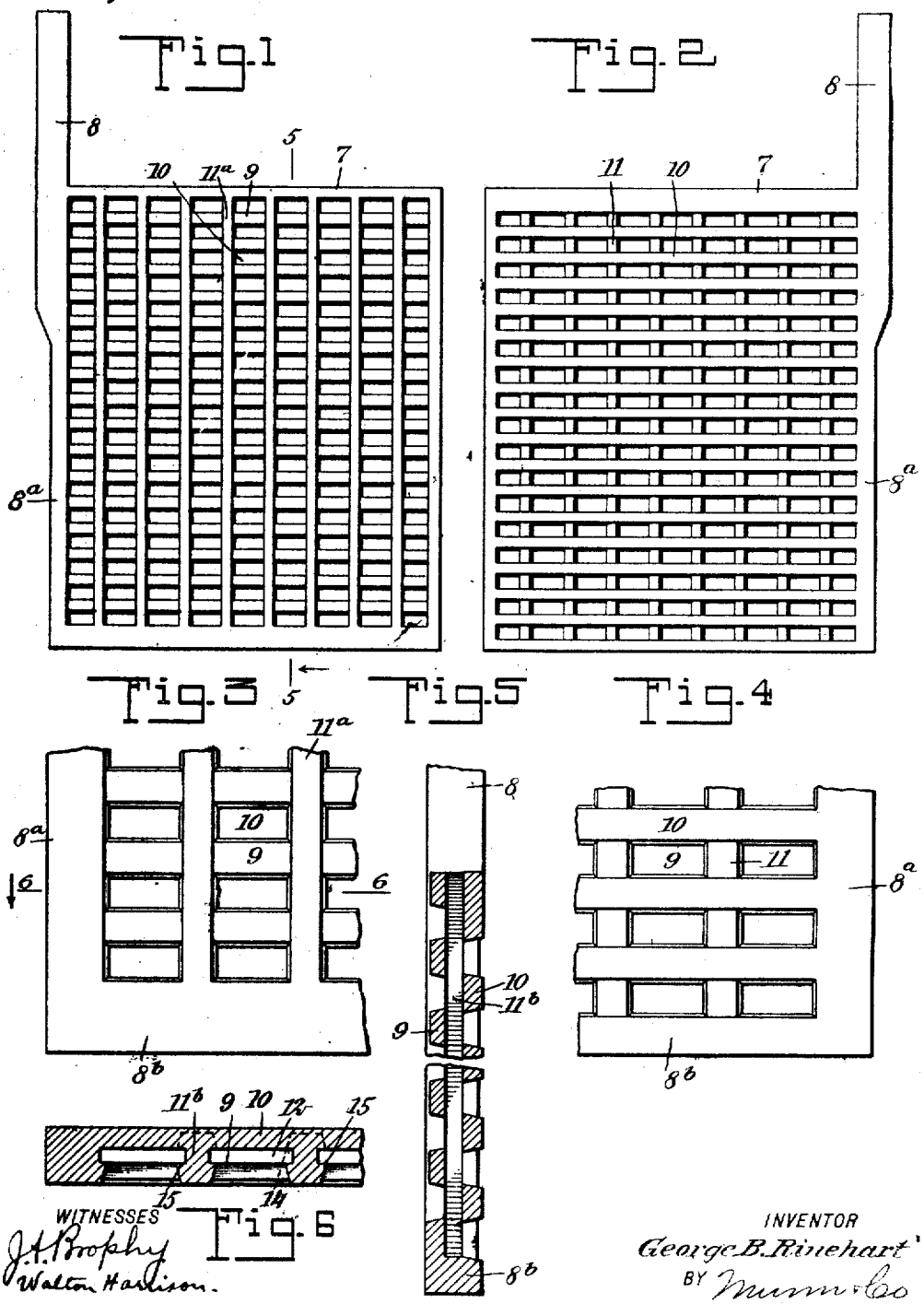

GEORGE B. RINEHART, OF ASHLAND, WISCONSIN.

BATTERY-PLATE.

No. 909,673.  Specification of Letters Patent.  Patented Jan. 12, 1909.

Application filed February 4, 1908. Serial No. 414,226.

*To all whom it may concern:*

Be it known that I, GEORGE B. RINEHART, a citizen of the United States, and a resident of Ashland, in the county of Ashland and State of Wisconsin, have invented a new and Improved Battery-Plate, of which the following is a full, clear, and exact description.

My invention relates to battery plates, my more particular object being to produce a type of plate suitable for use in storage batteries, and perhaps in some instances in dry batteries, the arrangement of the plate being such as to hold the active material in place.

Reference is to be had to the accompanying drawings forming a part of this specification, in which drawings like characters of reference indicate like parts throughout the views, and in which—

Figure 1 is a front elevation of a grid forming the base of the plate, this view showing one complete face of the grid; Fig. 2 is a rear elevation of the grid; Fig. 3 is an enlarged fragmentary elevation of the lower left hand corner of the grid; Fig. 4 is an enlarged fragmentary elevation of the lower right hand corner of the grid; Fig. 5 is a vertical cross section upon the line 5—5 of Fig. 1, looking in the direction of the arrow, and showing how the front and back bars are spaced relatively to each other and staggered for the purpose of retaining the active material, and Fig. 6 is a section upon the line 6—6 of Fig. 3, looking in the direction of the arrow and showing the vertical compartments to be filled with active material, and showing the spaces whereby this active material is filled intermediate the bars 9 and 10, this view further showing shoulders for holding the active material within the vertical compartments.

The grid may, as usual, be constructed of lead or other appropriate substance, and the active material used may be a compound of lead or any other material suitable for the purpose. The rim 7 is provided with an upwardly-extending tang 8 of sufficient size to afford a proper degree of strength. The rim 7 is continued at 8ᵃ and at 8ᵇ and is integral with the tang 8. Front and back bars 9, 10 extend horizontally from one edge to another of the grid, and are staggered as will be understood from Fig. 5. Vertical bars 11, 11ᵃ are disposed in alinement with each other and are connected together by smaller bars 11ᵇ (see Fig. 6), all of these parts being integral. Intermediate the bars 11ᵇ are longitudinal compartments 12 disposed vertically and extending practically from the top to the bottom of the grid. Shoulders 14, 15 bound the compartments 12, and increase the stability of the material contained within these compartments.

My invention is used as follows: The grid being cast in one piece and having the conformation above described, the active material is filled into the vertical compartments 12 and is also filled into the spaces intermediate the front and back bars 9, 10. Being thus arranged, as may be understood from Fig. 5, some portions of the active material are staggered relatively to the other portions, and yet all of the active material is integrally connected together. The shoulders 14, 15 serve effectively to hold firmly in position the active material filled into the vertical compartments 12, and to prevent any accidental movement of this material or any buckling of any part of the material while the grid is being charged or discharged.

The construction above described presents the following advantages, to wit: The active material is not readily disengaged from the grid and, therefore, cannot be loosened or caused to fall from the same. The internal resistance of the battery plate is reduced to a minimum and the efficiency is proportionately increased. The grid is unable to disintegrate, and can stand under heavier charges and discharges of the current. The exposed surface of the grid is increased, there being in effect four surfaces. Crinkling and buckling being prevented, the grid retains its general conformation better than in other grids.

Having thus described my invention, what I claim as new and desire to secure by Letters Patent is:

A battery grid comprising a rim provided with an integral tang, front horizontal bars arranged in spaced relation within the rim, and back horizontal bars arranged in spaced relation within the rim, and spaced apart from the front bars, and staggered with respect thereto, and vertically disposed bars arranged within the rim, and between the front and the back bars, and having a depth substantially equal to that of the front and back bars and spaced therebetween, the portions of the vertical bars between the front and back bars being of lesser
5 width whereby to form shoulders for the purpose set forth.

In testimony whereof I have signed my name to this specification in the presence of two subscribing witnesses.

GEORGE B. RINEHART.

Witnesses:
THEO. WERDER,
HENRY BITSCHENAUER.